Nov. 14, 1967 C. H. KLUTE 3,352,198
STAGE INTERFEROMETER FOR MICROINTERFEROMETRY
Filed March 30, 1964 2 Sheets-Sheet 2

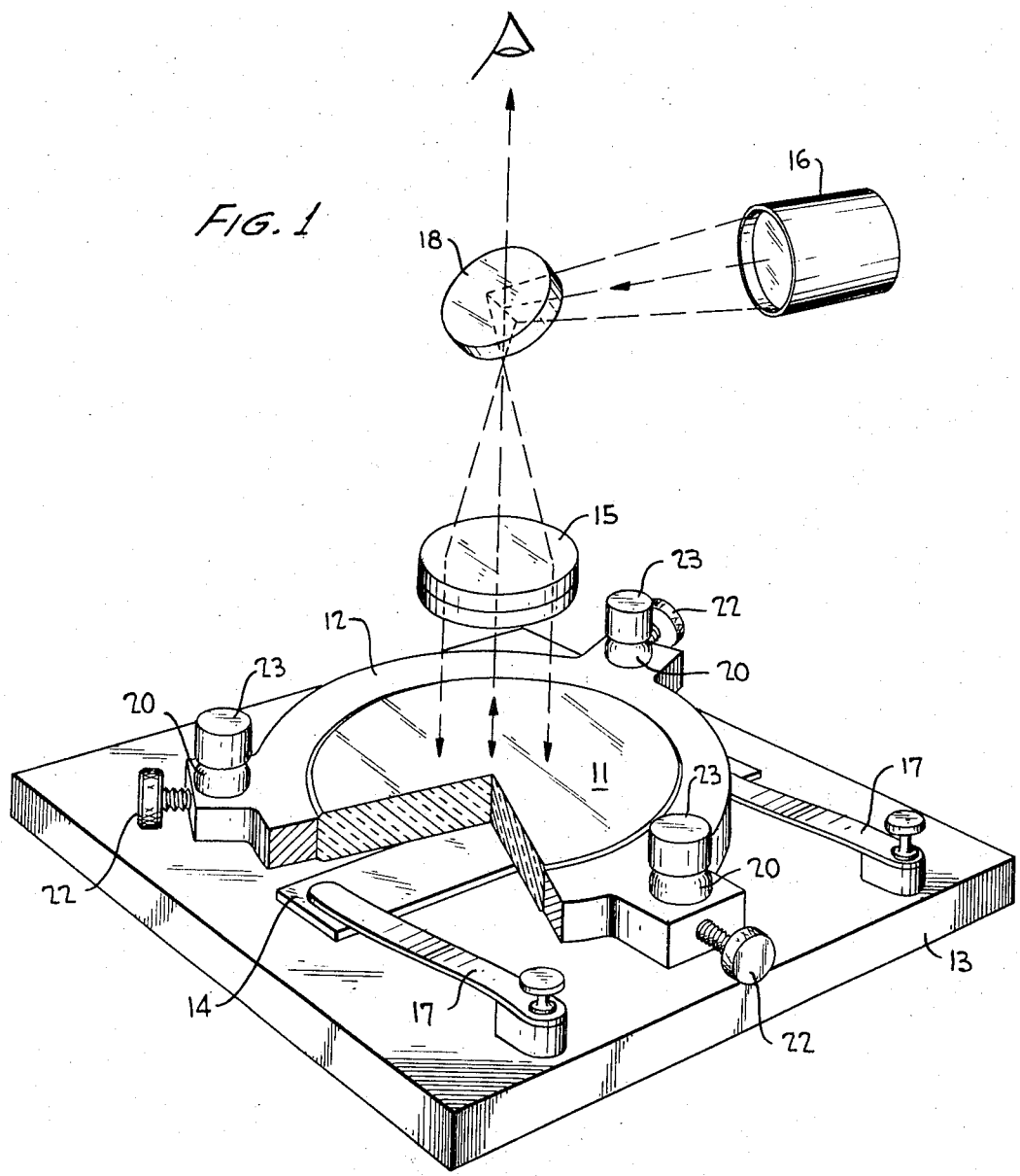

INVENTOR,
CHARLES H. KLUTE
BY Harry M. Saragovitz,
Edward J. Kelly, Herbert Berl, &
L. J. Markoefer 3,352,198
STAGE INTERFEROMETER FOR
MICROINTERFEROMETRY
Charles H. Klute, Washington, D.C., assignor to the
United States of America as represented by the
Secretary of the Army
Filed Mar. 30, 1964, Ser. No. 355,973
2 Claims. (Cl. 88—14)

ABSTRACT OF THE DISCLOSURE

Microinterferometry apparatus which allows an optical flat to be finely adjusted relative to a test specimen in order to obtain an optical wedge between the flat and specimen. A yoke holding the optical flat is mounted on a base plate and fixedly attached to posts protruding therefrom which slip through coinciding holes in the yoke. Means are provided to accurately raise and lower the posts relative to the base plate thus permitting an optical wedge to be formed in any desired direction.

---

The invention described herein may be manufactured and used by or for the Government of the United States of America for governmental purposes without the payment to me of any royalty thereon.

This invention relates to microscope accessories and more particularly to an improved stage interferometer.

A detailed optical inspection of surfaces is now frequently accomplished by the method of multiple-beam interferometry. In this method an optical wedge is formed between the surface under inspection and an optical flat or matching surface. When parallel, monochromatic light is passed through such a wedge, interference fringes are formed and these fringes deviate from a straight line wherever the surface under examination deviates from perfect planarity. Usually the measurement is conducted on the stage of a microscope and both the sample surface and the optical flat, which form the optical wedge, are made highly reflective.

In order to reveal particular aspects of the surface structure it is necessary to cause the interference fringes to run along any predetermined direction relative to the surface of the sample. The direction of the fringes on the surface of the sample is changed by a very critical adjustment of the strike and dip of the optical flat relative to the specimen. This adjustment is ordinarily made by three ordinary screw adjustments which tilt the flat, relative to the specimen, in the desired manner. Generally this is a very vexing adjustment taking considerable time and patience.

It is an object of this invention to provide an improved system to allow an optical flat to be adjusted relative to a test specimen in order to obtain an optical wedge between the flat and specimen.

Another object of this invention is to provide for the adjustment of an optical flat relative to a test specimen where the coarse adjustment may be made rapidly and easily, while permitting precise fine adjustment.

A further object of this invention is to provide an interferometer fixture which permits rapid coarse adjustment using a differential screw for fine adjustment.

Still another object of this invention is to provide an interferometer fixture which prevents lateral movement of the optical flat relative to test specimen.

One additional object is to provide an interferometer fixture having a differential screw fine adjustment which allows the optical flat to be completely removed from the specimen without disturbing the relative positions of the component parts of the differential screw.

One further object of this invention is to provide an interferometer fixture which is easy, simple and inexpensive in construction and simple in use.

Still another object of this invention is to provide a differential screw adjustment device where the relative positions of the component parts are fixed.

These and other objects of this invention are achieved through a novel yoke and post arrangement employed by applicant. The optical flat is mounted in a yoke with three post receiving holes therein. Mounted on the base plate are three posts. The posts are spaced so that the holes in the yoke will coincide and the yoke may be slipped over the posts. After the yoke has been slipped over the posts, means are provided to secure the yoke to the posts. Means are also provided to accurately raise and lower the post relative to the base plate and moving the yoke relative to the plate permits an optical wedge to be formed in any desired direction.

In the particular embodiment of the invention shown, applicant uses a novel differential screw arrangement to raise and lower the post. This novel arrangement allows the yoke to be secured to the post and prevents movement of the screw relative to the post or the plate alone.

The specific nature of the invention, as well as other objects, uses and advantages thereof, will clearly appear from the following description and from the accompanying drawing, in which:

FIG. 1 is a partial sectional view of one embodiment of this invention, with a test specimen in place.

Figure 4:
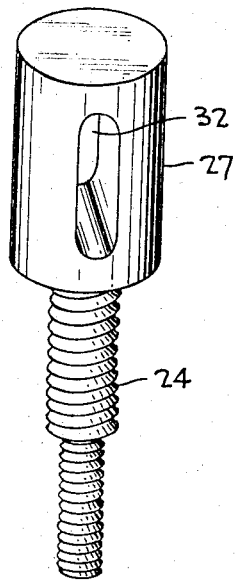
FIG. 4 is a detailed perspective view of the differential screw sliding head.

FIG. 1 shows an optical flat 11 mounted in a yoke 12 and positioned on top of a glass slide 14 which contains a specimen to be examined. The slide 14 is resting on a base plate 13 and held in place by a pair of standard spring clips 17. The base plate 13 can be integral with a mechanical stage of a microscope. Mounted on the base plate 13 are three posts or bosses 20.

The microscope stage can be of any standard commercial manufacture. The cross feeds of the microscope stage are not shown since they form no part of this invention. Merely for ease of understanding and orienting the stage 13 in space, a microscope objective 15, a light source 16 and the half silvered mirror 18 are shown. This would be the schematic arrangement of light source and objective where reflection interference patterns are to be observed. As will be apparent to those skilled in the art, applicant's novel arrangement is equally suitable for transmission patterns. Details of various interferometer techniques may be found in "Surface Microtopography" by S. Tolansky, published in 1960 by Interscience Publishers, Inc., New York, N.Y.

Figure 2:
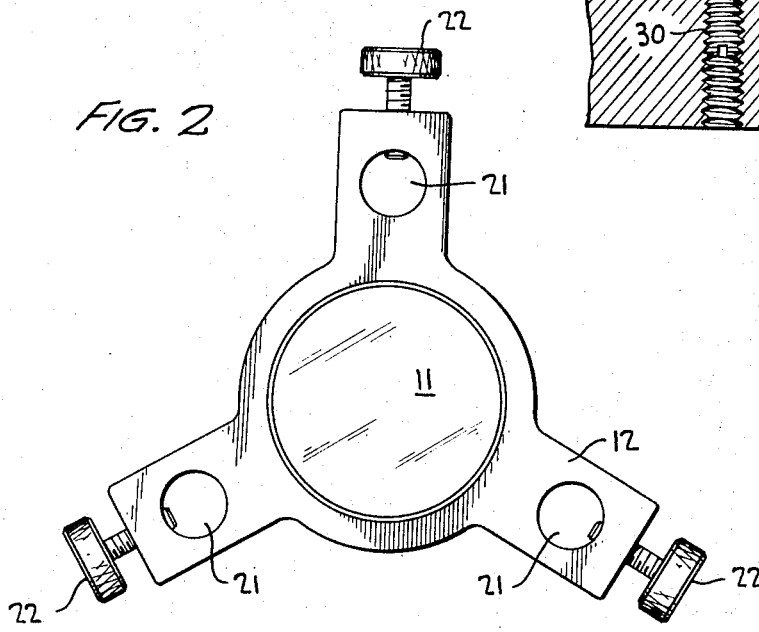
FIG. 2 is a plan view of a yoke.

The yoke 12, which is shown in detail in FIG. 2, carries the centrally mounted optical flat 11 which may be held in place by any of a number of methods known in the art, such as cementing. The yoke 12 has three openings or holes 21 spaced about the periphery of the optical flat 11 which are designed to fit accurately on bosses 20, as shown in FIG. 1. Bosses 20 are secured to the base plate 13, as will be explained in more detail in connection with FIG. 3. Means, in the form of set screws 22, are provided to secure the yoke 12 to the bosses 20.

In practice, slide 14 is first secured to the base or microscope stage 13 by means of clips 17. The yoke 12 is then placed down over the bosses 20—the openings 21 receiving the bosses 20. The yoke 12 may be lowered until the flat 11 comes in contact with the specimen on slide 14. The set screws 22 are tightened clamping the yoke 12 on to the bosses 20. The coarse adjustment of the optical flat has thus been accomplished.

Figure 3:
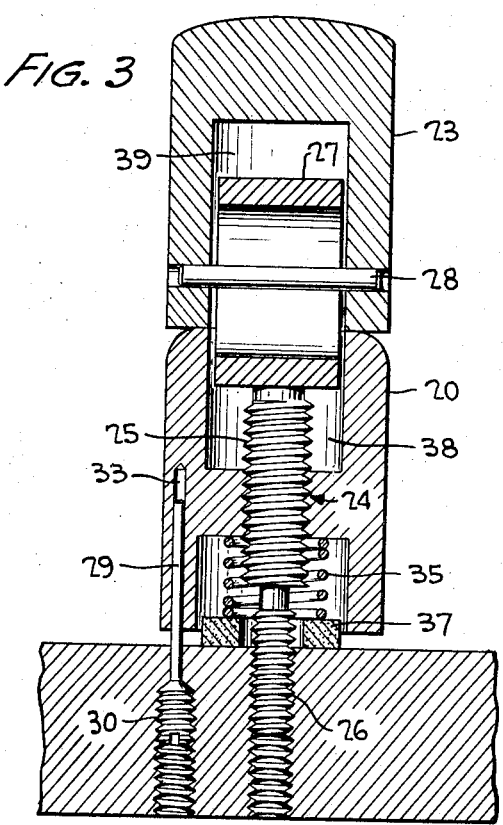
FIG. 3 is a sectional view of a post, showing the differential screw arrangement.

As will become more apparent from the explanation of FIG. 3, turning one of knobs 23 accurately raises and lowers the boss 20 associated with the particular knob. Boss 20 moves up and down perpendicularly to the base 13 raising and lowering the optical flat 11 relative to the specimen permitting an optical wedge to be formed between the specimen on slide 14 and flat 11.

FIG. 3 shows a cutaway view of the boss 20 and knob 23. By means of the construction shown in FIG. 3 applicant is able to precisely raise and lower boss 20 relative to base 13.

The mechanism for raising and lowering the boss 20 includes a differential screw 24. One section 25 of the screw 24 has a first pitch (4–48 machine thread for example) and the other section 26 has a second different pitch (2–56 machine thread for example). The pitch of both sections is in the same sense—i.e. right hand or left hand. Differential screw 24 is secured to a head 27, which is shown in perspective in FIG. 4. Head 27 is keyed for rotative movement with knob 23 by means of pin 28. Pin 28 passes through an elongated slot 32 in head 27 permitting head 27 to slide up and down inside of knob 23.

Rotation of boss 20 is prevented by means of pin 29 which may be screwed into slot 33 in the boss 20. This arrangement permits an up and down movement of boss 20 relative to the base 13 while restraining rotational movement of the boss 20. This prevents movement of the screw 24 relative to either the boss 20 or plate 13 alone, which insures a full range of adjustment and prevents the boss 20 from accidently becoming disengaged from plate 13.

Section 25 of the differential screw 24 is threaded through boss 20 and section 26 is threaded into the base 13. A bias spring 35 is placed within a cavity 36 in the boss 20 to provide smooth action and remove backlash from the mechanism. A plastic washer 37 is provided at the end of spring 35 to help seal the cavity 36 and to keep out dust.

Rotation of the knob 23 rotates the differential screw 24 via member 27 and pin 28. Common rotation of sections 25 and 26 of screw 24 causes differential motion of the boss 20 relative to the base 13 which is much finer than that which would be produced by either section 25 or 26 acting alone. In fact, with combination of 4–48 machine thread and 2–56 machine thread the differential motion corresponds to that of a simple screw with about 333 turns per inch.

With standard right hand pitches on both sections 25 and 26 of screw 24, clockwise rotation of the knob 23 causes boss 20 to rise on section 25 of screw 24 while the screw 24 itself is being lowered into the base 13. The difference in these two motions is the net movement of the boss 20 relative to base 13. Member 27 of course moves relative to boss 20 as knob 23 is rotated. Cavity 38 is provided in boss 20 and hole 39 in knob 23 to allow member 27 to ride up and down on pin 28, thereby permitting knob 23 to stay with boss 20.

Applicant's novel system allows the optical flat to be quickly and conveniently brought into contact with the specimen at which time fringes will be seen. By securing the flat to the bosses the adjustment of the flat may be trimmed quickly and precisely for the desired fringe direction.

It will be apparent that the embodiments shown are only exemplary and that various modifications can be made in construction and arrangement within the scope of the invention as defined in the appended claims.

I claim as my invention:

1. An improved stage interferometer for microinterferometry including a fixture for obtaining an optical wedge between flat and specimen, comprising the combination:
   (a) a yoke having an opening to receive an optical flat,
   (b) a plurality of boss receiving openings in said yoke, said boss receiving openings spaced around the periphery of said optical flat opening,
   (c) a base adapted to receive a specimen which is to be examined,
   (d) a plurality of bosses secured to said base, said bosses being placed on said plate so that said bosses can be aligned with said boss receiving openings in said yoke, the diameter of said bosses permitting said yoke to be freely lowered over them,
   (e) means to secure said yoke to said bosses after said yoke has been lowered over said specimen, and
   (f) means to accurately raise and lower each of said bosses, wherein said means includes a differential screw, said differential screw having a first section with a first screw pitch and a second section with a second different pitch, said first section passing through said boss and threadedly engaging said boss, said second section threadedly engaging said base, with means preventing rotational movement of said boss while allowing said boss to be raised and lowered relative to said base and means to rotate said differential screw.

2. An improved stage interferometer as in claim 1 further including a spring bias means to provide a smooth, tight adjustment, said bias spring located in a cavity in said boss and exerting a force between said base and said boss.

References Cited
UNITED STATES PATENTS

| | | | |
|---|---|---|---|
| 2,489,487 | 11/1949 | Gradisor et al. | 350—84 |
| 3,045,535 | 7/1962 | Jacquinot et al. | 88—14 |
| 3,065,663 | 11/1962 | Donnelly et al. | 88—14 |

JEWELL H. PEDERSEN, *Primary Examiner.*

B. J. LACOMIS, *Assistant Examiner.*